March 13, 1951 E. MITTELMANN 2,545,297

OSCILLATION FREQUENCY CONTROL

Filed March 13, 1946

INVENTOR.
Eugene Mittelmann
BY
Moore, Olson and Trexler
Attys.

Patented Mar. 13, 1951

2,545,297

UNITED STATES PATENT OFFICE 2,545,297

OSCILLATION FREQUENCY CONTROL

Eugene Mittelmann, Chicago, Ill.

Application March 13, 1946, Serial No. 654,199

2 Claims. (Cl. 250—36)

Figure 2:
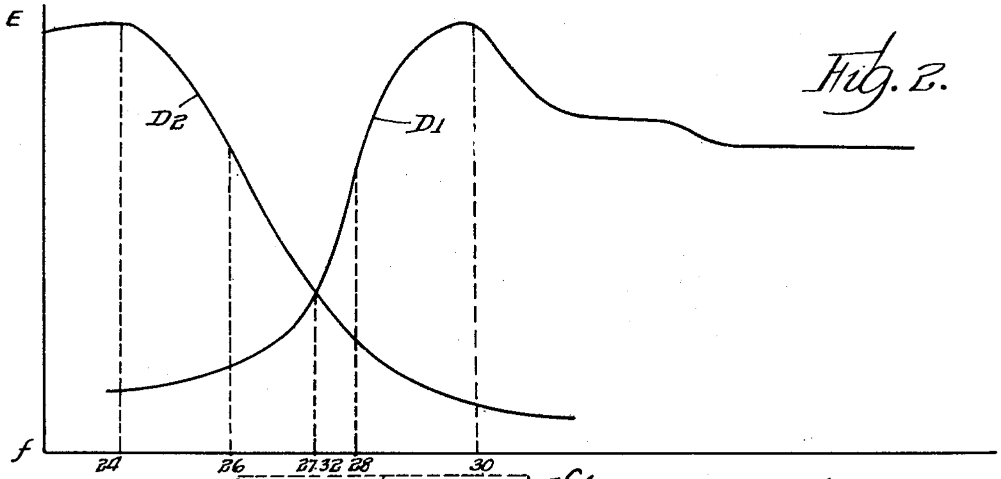

This invention relates to a method and apparatus for heating by means of high frequency electrical current.

My invention is concerned with a method and means for adjusting an oscillator generator to a predetermined frequency value when a heater load is initially applied to the oscillator and to maintain the operating frequency at substantially said predetermined value as the loaded heater impedance varies during the heating operation.

A certain portion of the frequency spectrum has been set aside by governmental authority for use by high frequency heating generators. The operating frequency must be maintained at a desired value which should be within ±.2%. Since the electrical characteristics of the material to be heated change during the heating cycle, the impedance of the load materially changes, thereby affecting the operating frequency of the oscillator. For different sizes of material or volumes of material to be heated, it is necessary to modify the coupling capacity which also is reflected by a change in the operating frequency of the oscillator generator. It therefore is necessary to provide some means which will be responsive to a deviation of the operating frequency greater than ±.2% which will control apparatus to restore the operating frequency of the oscillator generator to its normal predetermined frequency.

Frequency control circuits have been employed in connection with communication apparatus, but it has been found that the discriminator circuits used for this purpose do not have a sufficiently broad control to be effective for an oscillator generator used for high frequency heating. The usual tuned circuit discriminators will not produce sufficient control potential when there is any appreciable deviation from the normal operating frequency, and hence if the normal operating frequency exceeds a relatively small value these discriminating circuits will not automatically maintain the oscillator at the operating frequency. The necessity for a wider range of control is readily appreciated by consideration of the fact that the impedance of the load during the heating cycle varies greatly and that the magnitude of the coupling ratio must likewise vary over a wide range in order to provide a reasonable matching relation between the optimum impedance of the generator and the impedance of the load. When the heated material or article is removed, and a charge of a different material or article is inserted in the heater, it is frequently necessary to change the coupling in order to prevent excessive load on the oscillator and to prevent flashover. With such adjustments being required it is apparent that any control system must be capable of restoring the oscillation generator to its normal operating frequency from high off-normal values.

In accordance with my invention I provide in an automatic control circuit for initially tuning, and subsequent continuously retuning, an oscillator to a given frequency, a control circuit employing a combination of a high pass filter and a low pass filter having overlapping relatively sharp frequency cut-off characteristics, so that the control apparatus will, during the heating operation, hold the frequency within the stated maximum frequency deviation. These filters are designed with frequency pass characteristics such as to pass substantially all frequencies above or below the overlapping cut-off characteristics so that the control apparatus will initially tune the oscillation generator to the predetermined frequency from any frequency value at which it may operate, i. e. start oscillation.

Other and further advantages will become apparent by reference to the following description taken in conjunction with the accompanying drawing, wherein—

Figure 1:
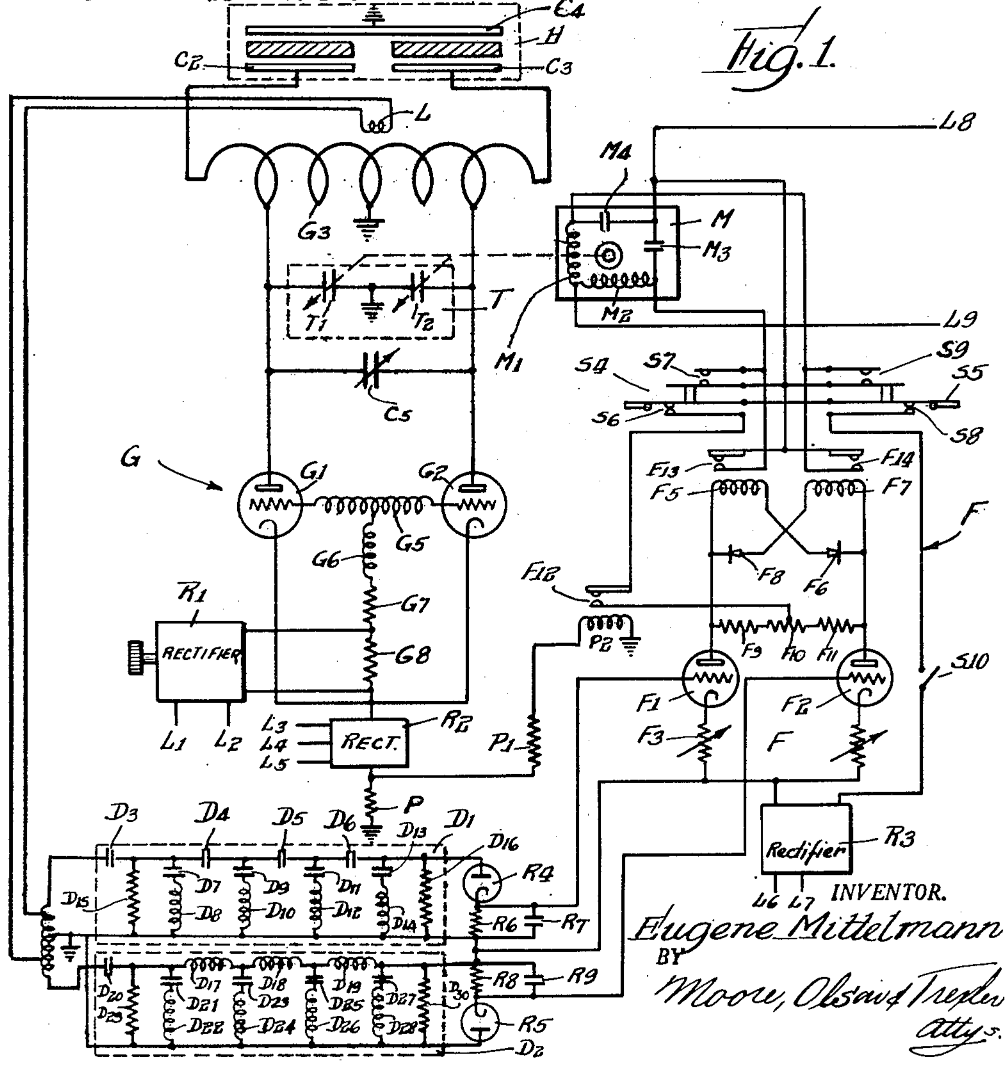

Figure 1 is a schematic circuit diagram showing the application of my invention to a high frequency oscillation generator; and Figure 2 is a graphical representation of the characteristics of the filters employed in the circuit of Figure 1.

The schematic circuit diagram of Figure 1 shows an oscillation generator employing a pair of vacuum tubes G1 and G2 having their anodes connected to a tank inductor G3 which may be tuned by a capacitor C5. The grids of the vacuum tubes G1 and G2 are connected to an inductor G5 which at a center tap is connected to a series circuit comprising an inductor G6 and resistors G7 and G8. The resistor G8 is connected to the cathodes of the vacuum tubes G1 and G2 and also to the negative terminal of a source of anode potential obtained from a polyphase rectifier R2 having its positive terminal connected through a resistor P to ground. The midpoint of the tank inductor G3 is also connected to ground. The rectifier R2 may be energized from suitable alternating current lines L3, L4 and L5. The grid circuits of the vacuum tubes G1 and G2 are provided with a controlled grid bias obtained from a rectifier R1 which may be energized from alternating current lines L1 and L2. The rectifier R1 is provided with a control so that the power output of the oscillator may be adjusted.

The tank circuit including the inductor G3 is connected to the terminals of the reactive heater H which may be either inductive or capacitive. For purposes of illustration, a dielectric heater is shown. The plates C2 and C3 are connected by suitable conductors to the ends of the tank inductor G3. The heater H has a third plate C4 connected to ground.

The tank circuit is tuned by a capacitor C5 and a tuner T which may comprise variable condenser T1 and T2 driven by the motor M. The motor M is arranged to operate in either of two directions in response to a follow-up control circuit so that the turner T will be adjusted to bring the operating frequency of the oscillator G to its predetermined value. The follow-up control circuit F employs a pair of vacuum tubes F1 and F2 provided with cathode biasing resistors F3 and F4 which are connected together to one side of a source of anode potential obtained from a rectifier R3. The rectifier R3 is energized from alternating current obtained from the lines L6 and L7. The anode of the vacuum tube F1 is connected through a relay coil F5 and a contact rectifier or unilaterally conductive device F6 to the anode of the vacuum tube F2. The anode of the vacuum tube F2 is connected through a relay coil F7 and a contact rectifier F8 to the anode of the vacuum tube F1. Connected between the anodes of the vacuum tubes F1 and F2 are a plurality of resistors F9, F10 and F11. The resistor F10 is provided with a midtap which is connected to the contacts F12 of a relay P2. The relay P2 is connected between ground and the resistor P which is connected to the positive terminal of the plate voltage rectifier R2 of the oscillator C. The contacts F12 of the relay P2 are connected in series with the normally closed contacts S6 of a manually operable switch S4, and the normally closed contacts S8 of another manually operable switch S5 and through a switch S10 to the positive side of the rectifier R3.

The relay coil F5 is provided with a pair of normally open contacts F13 which are connected between certain points in the circuit of the motor M. Similarly the relay coil F7 controls the normally open contacts F14 which are connected between different points in the circuit of the motor M.

The motor M is a reversible alternating current motor such as a drag cup type having two inductive windings M1 and M2 associated with capacitors M3 and M4. One of the contacts of the normally open pair of contacts F13 of the relay F5 is connected to the juncture between the inductor M2 and the capacitor M3. The other contact of the pair of contacts F13 is connected to the common juncture between the capacitors M3 and M4. Thus a closing of the contacts F13 operates to short circuit the capacitor M3. The contacts F14 of the relay F7 are connected between the common junctures of the capacitors M3 and M4 and the juncture between the capacitor M4 and the winding M1 so that the closing of these contacts operates to short circuit the capacitor M4. The pair of contacts F13 are connected in parallel to a pair of normally open contacts S7 of the manually operable switch S4. Similarly the pair of contacts F14 are connected in parallel with normally open contacts S9 of the manually operable switch S5. The switches S4 and S5 are provided for manual control of the adjustment of the tuner. The common juncture between the motor windings M1 and M2 is connected to one alternating conductor L9. The common juncture between the capacitors M3 and M4 is connected to an alternating current conductor L8.

A portion of the energy of the tank coil G3 is taken by a pick-up coil L which is connected by conductors to a discriminating circuit employing a high pass filter D1 and a low pass filter D2. The high pass filter may comprise series condensers D3, D4, D5 and D6, shunt condensers and chokes D7, D8, D9, D10, D11, D12, D13, D14, and shunt resistors D15, D16. The low pass filter may comprise series chokes D17, D18, D19 and condenser D20, shunt condensers and chokes D21, D22, D23, D24, D25, D26, D27 and D28, and shunt resistors D29 and D30. The output of the high pass filter D1 is connected across a rectifier R4 and a resistor R6 which is bypassed by a capacitor R7. The positive terminal of resistor R6 is connected to the grid of the vacuum tube F1. The output of the low pass filter D2 is connected across a rectifier R5 and a resistor R8 which is by-passed by a capacitor R9. The positive terminal of the resistor R8 is connected to the grid of the vacuum tube F2. The negative terminals of the resistors R6 and R8 are connected to the common juncture between the cathode bias resistors F3 and F4 of the vacuum tubes F1 and F2.

When the plate potential of the vacuum tubes G1 and G2 has reached a predetermined value, the relay P2 is operated. This closes the switch contacts F12 which thereby complete the circuit between the source of anode potential of the rectifier R3 and the anodes of the bridge network vacuum tubes F1 and F2. The bridge network F thereupon is in condition to automatically adjust the position of the tuner condensers T1 and T2. This is brought about by the energy picked up by the coil L from the tank circuit coil G3 of the oscillation generator G which is passed to the discriminator networks D1 and D2. If the frequency of operation is above the desired operating frequency, high frequency energy will be passed by high pass filter D1, but rejected by low pass filter D2, and applied to the rectifier R4 to develop a control voltage across the resistor R6. This places a positive bias upon the grid of the vacuum tube F1 thus increasing the flow of anode current so that the relay coil F5 receives sufficient energy to close its contacts F13. Closing of the contacts F13 completes a circuit to the motor M which drives the tuner condensers. If the frequency of operation is initially below the desired, predetermined value, low pass filter D2 passes the energy, but filter D1 rejects it, and through rectifier R5 a control voltage is developed across resistor R8 to operate tube F2 and its controlled relay F7 to operate the motor and tuner in the opposite direction.

Figure 2 graphically illustrates the operating characteristics of the discriminator filters D1 and D2. The voltage developed across the output is plotted against frequency. The curve D1 corresponds to the characteristic of the high pass filter D1 and the curve D2 corresponds to the characteristic of the low pass filter. It will be seen that the desired operating frequency has been selected as 27.32 megacycles. The curves D1 and D2 cross at this point and the slopes of the cut-off characteristics of the curves are such that a strong response will be obtained for a frequency deviation on the order of 50 kilocycles. Thus if the frequency of the generator G exceeds the normal frequency of operation, a voltage will be developed across resistor R6. The other filter D2, however, develops a reduced voltage across resistor R8, and hence the grid of the vacuum tube F1 is considerably more positive than the grid of the vacuum tube F2. As the motor drives the tuner, the operating frequency will be lowered, and when the frequency of 27.32 megacycles is reached, the rectifiers in the outputs of the two filters D1 and D2 will develop equal voltages across R6 and R8 with the result that the two vacuum tubes F1 and F2 are balanced and neither of the relay coils F5 or F7 is energized.

The curves shown in Figure 2 were taken from curves plotted from actual equipment using the filters shown in Figure 1 and found to control the operating frequency of the oscillation generator G within the limits of ±.2% deviation.

When the operating frequency of the generator G is lower than the desired frequency, it will be seen that the curve D2 shows that a higher voltage will be developed by the rectifier R5 across the output of the low pass filter D2 than is developed by the rectifier R4. Hence the grid of the vacuum tube F2 will be appreciably more positive than the grid of the vacuum tube F1, thus resulting in the energization of the relay coil F7 which closes its contacts F14. The closing of the contacts F14 causes the motor M to operate in a reverse direction until the contacts F14 are opened by deenergization of the relay coil F7.

It will be further evident from the curves of Figure 2 that the frequency pass characteristic of the high pass filter remains at a high level, which varies little, as the frequency increases above 30 megacycles. Similarly the frequency pass characteristic of the low pass filter remains at a high level, which is substantially constant as the frequency falls below 24 megacycles. Thus a sufficient supply voltage to operate the tuner is obtained even when the frequency is far from the desired operating frequency. This assures the automatic operation of the tuner to initially adjust the frequency to the required value notwithstanding wide variations in the impedance of the loads initially applied.

From the foregoing explanation of the operation of the circuit of Figure 1, it will be seen that the bridge amplifier network F responds to frequency deviations of the oscillation generator G to restore the operation of the generator to its assigned frequency.

When the heater load is initially applied, the apparatus automatically adjusts itself to the predetermined operating frequency, whatever may be the value of the load within the operating load limits of the oscillator. Thereafter, the apparatus continuously adjusts itself to maintain that operating frequency constant notwithstanding changes in the impedance of the heater load during the heating operation.

The manually operable switches S4, S5 and S10 enable manual actuation of the tuner independently of the bridge network switch S10, when open, disabling the network and switches S4 and S5 controlling the energization and direction of operation of the motor M.

While certain specific circuit details have been disclosed and described herein for the purpose of illustrating my invention, it will be apparent that variations and changes may be made without departing from the spirit and scope of the appended claims.

This invention is hereby claimed as follows:

1. A high frequency heating apparatus comprising a vacuum tube oscillator including a tuner, and adapted to be connected to a reactive heater the impedance of which varies during the heating operation to vary the frequency of operation of the oscillator, a frequency control circuit for said oscillator including electric motor means for driving said tuner, a pair of electronic discharge tubes arranged in a voltage balancing bridge circuit, means responsive to the polarity of a difference voltage provided by said voltage balancing bridge circuit for controlling the forward and reverse operations of said reversible electric motor means, a high pass filter and a low pass filter coupled to said oscillator, said filters having frequency cut-off characteristics overlapping at substantially a predetermined selected operating frequency of said oscillator and having frequency pass characteristics extending substantially to the frequency limits of the oscillation ability of the oscillator, rectifier means connected to and receiving energy passed by each of said filters for developing direct current potentials varying oppositely in magnitude in accordance with the deviation in frequency of the oscillators from said predetermined selected value, and means for applying said potentials to the tubes of said voltage balancing bridge circuit, said voltage balancing bridge circuit including means for balancing the said potentials against each other when the oscillator is operating at said predetermined selected frequency value.

2. A high frequency heating apparatus comprising a vacuum tube self excited power supplying oscillator having an output circuit adapted to be coupled to a variable impedance heater load circuit and reflecting frequency varying impedance values into said oscillator output circuit, said oscillator including a tuner, electric motor means for adjusting said tuner, frequency discriminator circuits including high pass and low pass filters directly coupled to the oscillator and having characteristic frequency cut-off curves overlapping at a predetermined frequency at which it is desired to operate said oscillator for supplying direct current potentials whose magnitudes are determined by the frequency of operation of the oscillator, a potential balancing bridge control circuit responsive to the potential supplied by said frequency discriminator circuits for controlling the operation of said motor to adjust the tuner when the frequency of operation of the oscillator differs from a predetermined value.

EUGENE MITTELMANN.

REFERENCES CITED

The following references are of record in the file of this patent:

UNITED STATES PATENTS

| Number | Name | Date |
|---|---|---|
| 1,493,600 | Campbell | May 13, 1924 |
| 1,794,932 | Usselman | Mar. 3, 1931 |
| 2,105,096 | Peterson | Jan. 11, 1938 |
| 2,112,826 | Cook | Apr. 5, 1938 |
| 2,211,750 | Humby | Aug. 20, 1940 |
| 2,232,390 | Katzin | Feb. 18, 1941 |
| 2,312,079 | Crosby | Feb. 23, 1943 |
| 2,316,017 | Peterson | Apr. 6, 1943 |
| 2,324,525 | Mittelmann | July 20, 1943 |
| 2,341,649 | Peterson | Feb. 15, 1944 |
| 2,354,510 | Earp | July 25, 1944 |
| 2,354,827 | Peterson | Aug. 1, 1944 |
| 2,358,454 | Goldstine | Sept. 19, 1944 |
| 2,374,810 | Fremlin | May 1, 1945 |
| 2,379,689 | Crosby | July 3, 1945 |
| 2,382,435 | Mann et al. | Aug. 14, 1945 |
| 2,396,004 | Gilbert | Mar. 5, 1946 |